(12) United States Patent
Nam et al.

(10) Patent No.: US 8,950,319 B2
(45) Date of Patent: Feb. 10, 2015

(54) COOKING APPLIANCE

(75) Inventors: Hyeunsik Nam, Seoul (KR); Seongho Cho, Seoul (KR); Seungjo Baek, Seoul (KR)

(73) Assignee: LG Electronics Inc., Seoul (KR)

(*) Notice: Subject to any disclaimer, the term of this patent is extended or adjusted under 35 U.S.C. 154(b) by 65 days.

(21) Appl. No.: 13/231,070

(22) Filed: Sep. 13, 2011

(65) Prior Publication Data

US 2012/0079948 A1    Apr. 5, 2012

(30) Foreign Application Priority Data

Sep. 30, 2010  (KR) .................. 10-2010-0094931
Sep. 30, 2010  (KR) .................. 10-2010-0094933
Sep. 30, 2010  (KR) .................. 10-2010-0094934

(51) Int. Cl.
   *A21B 1/22*    (2006.01)
   *H05B 6/64*    (2006.01)
   *A21B 1/26*    (2006.01)

(52) U.S. Cl.
   CPC ............... *H05B 6/6476* (2013.01); *A21B 1/26* (2013.01)
   USPC ............................ 99/476; 219/400; 126/21 A

(58) Field of Classification Search
   USPC .................... 99/476, 474, 468; 219/681, 400; 126/21 A
   See application file for complete search history.

(56) References Cited

U.S. PATENT DOCUMENTS

| 4,426,923 | A | * | 1/1984 | Ohata ............................ 99/468 |
| 5,089,679 | A | * | 2/1992 | Eke ............................... 219/680 |
| 5,451,744 | A | * | 9/1995 | Koopman et al. ............. 219/400 |
| 5,674,425 | A | * | 10/1997 | Hong ............................ 219/681 |
| 5,717,192 | A | * | 2/1998 | Dobie et al. .................. 219/681 |
| 2002/0088790 | A1 | * | 7/2002 | Nolan et al. ................. 219/400 |
| 2004/0040950 | A1 | * | 3/2004 | Carbone et al. ............... 219/400 |
| 2010/0192977 | A1 |   | 8/2010 | Jadhav et al. .................. 134/18 |
| 2010/0270293 | A1 | * | 10/2010 | McNamee et al. ........... 219/725 |

FOREIGN PATENT DOCUMENTS

CN            101191625 A        6/2008

OTHER PUBLICATIONS

European Search Report dated Feb. 19, 2014.
Chinese Office Action dated May 15, 2014 issued in Application No. 201110303824.2 (English Translation).

* cited by examiner

*Primary Examiner* — Reginald L Alexander
(74) *Attorney, Agent, or Firm* — Ked & Associates, LLP

(57) ABSTRACT

A cooking appliance is provided. An operation of a convection motor for operating a convection fan is controlled into various modes according to a cooking temperature and kind of food to be cooked within a cooking chamber. Thus, the food may be more effectively cooked according to the cooking temperature and the kind of food to be cooked.

22 Claims, 16 Drawing Sheets

(A)

(B)

(A)

(B)

COOKING APPLIANCE

CROSS-REFERENCE TO RELATED APPLICATIONS

The present application claims priority under 35 U.S.C. 119 and 35 U.S.C. 365 to Korean Patent Application No. 10-2010-0094931, 10-2010-0094933, 10-2010-0094934 (filed on Sep. 30, 2010), which is hereby incorporated by reference in its entirety.

BACKGROUND

The present disclosure relates to a cooking appliance.

Cooking appliances are electrical appliances for cooking foods within a cooking chamber using microwave or heat of a heater. Such a cooking appliance includes a convection device for providing hot wind having a high temperature into the cooking chamber. Generally, the convection device includes a convection chamber communicating with the cooking chamber, a convection heater disposed inside the convection chamber, a convection fan for circulating air heated by the convection heater into the cooking chamber and the convection chamber, and a convection motor for driving the convection fan.

SUMMARY

Embodiments provide a cooking appliance having improved cooking efficiency.

In one embodiment, a cooking appliance includes: a cooking chamber in which a food is cooked; a chamber communicating the cooking chamber; a cross flow fan circulating air between the cooking chamber and the chamber; a motor including a motor shaft coupled to the cross flow fan, the motor providing a driving force for rotating the cross flow fan; a heating source heating air discharged from the inside of the chamber to the inside of the cooking chamber; and a temperature detection part disposed inside the chamber corresponding between an intake hole and the cross flow fan to detect a temperature of air sucked from the inside of the cooking chamber to the inside of the chamber, wherein the cross flow fan performs a continuous ON operation at a maximum rotation rate, repeatedly performs an ON/OFF operation at the maximum rotation rate for a preset period, or continuously performs an ON operation at a set rotation rate in which the maximum rotation rate is reduced by a preset ratio.

In another embodiment, a cooking appliance includes: a cavity having a cooking chamber in which a food is cooked, the cavity having an intake hole and an exhaust hole which are defined in a back plate defining a rear surface of the cooking chamber and spaced from each other; a heating source providing an energy for cooking the food in the cooking chamber; a convection cover fixed to the rear surface of the back plate, the convection cover defining a convection chamber between an inner surface thereof and the rear surface of the back plate; a convection fan installed inside the convection chamber, the convection fan blowing air in a direction perpendicular to that of a rotation shaft so that the air is sucked from the inside of the cooking chamber to the inside of the convection chamber through the intake hole and discharged from the inside of the convection chamber to the inside of the cooking chamber through the exhaust hole; a convection motor including a motor shaft which provides a driving force for rotating the convection fan; a convection heater installed inside the convection chamber to heat the air flowing by the convection fan; and a thermistor detecting a temperature of the air sucked from the inside of the cooking chamber to the inside of the convection chamber through the intake hole, wherein the convection heater repeatedly performs an ON/OFF operation for a preset period, and the convection fan performs a continuous ON operation at a maximum rotation rate, repeatedly performs an ON/OFF operation at the maximum rotation rate for a preset period, or continuously performs an ON operation at a set rotation rate in which the maximum rotation rate is reduced by a preset ratio.

In further another embodiment, a cooking appliance includes: a cavity having a cooking chamber in which a food is cooked; a convection cover defining a convection chamber between an inner surface thereof and a rear surface of the cavity; a convection fan blowing air in a direction perpendicular to that of a rotation shaft to circulate the air between the cooking chamber and the convection chamber; and a convection heater heating the air flowing by the convection fan, wherein the convection heater repeatedly performs an ON/OFF operation for a preset period, and the convection fan performs a continuous ON operation at a maximum rotation rate, repeatedly performs an ON/OFF operation at the maximum rotation rate for a preset period, or continuously performs an ON operation at a set rotation rate in which the maximum rotation rate is reduced by a preset ratio.

The details of one or more embodiments are set forth in the accompanying drawings and the description below. Other features will be apparent from the description and drawings, and from the claims.

DETAILED DESCRIPTION OF THE EMBODIMENTS

Hereinafter, a cooking appliance according to a first embodiment will be described in detail with reference to accompanying drawings. Specifically, a microwave oven for cooking foods using a microwave in cooking appliances will be described as an example.

Figure 1:
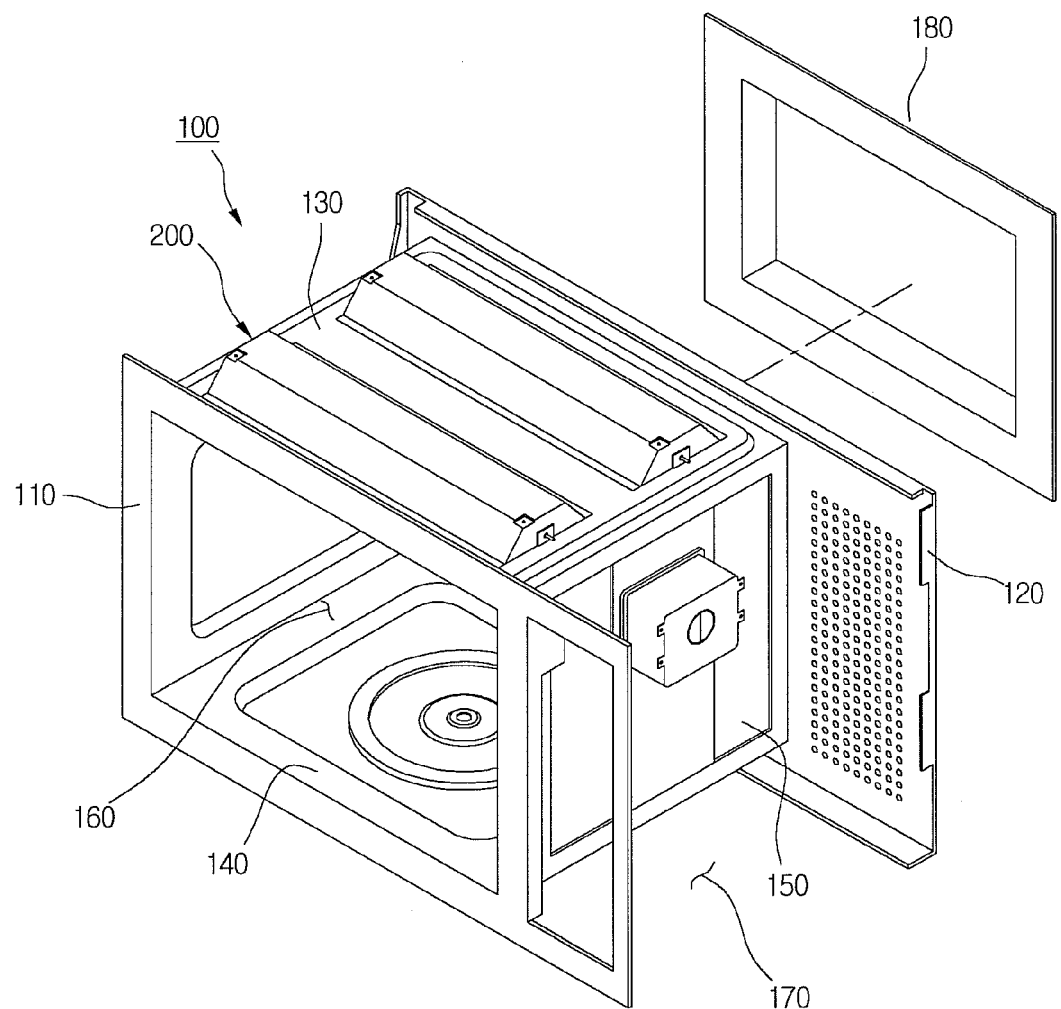
FIG. 1 is a perspective view of a cooking appliance according to a first embodiment.
Figure 2:
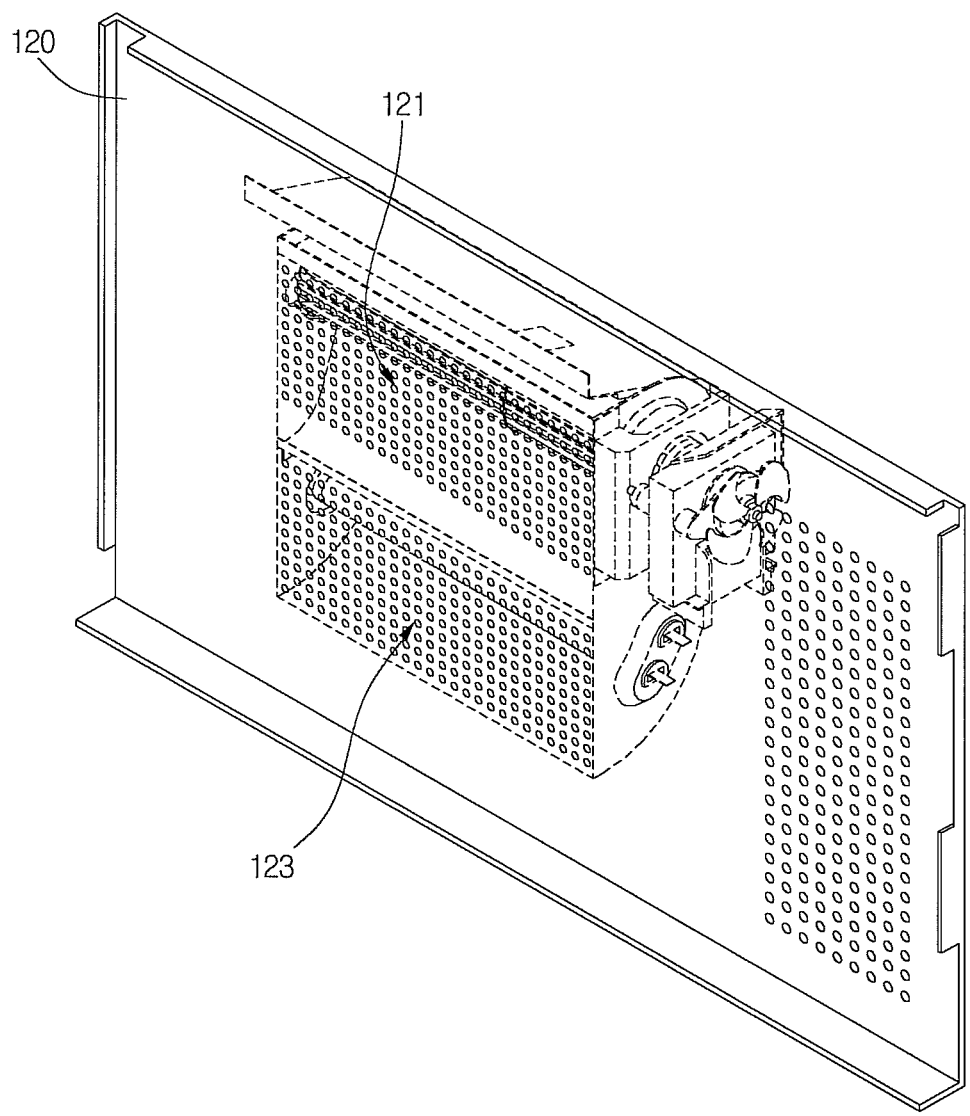
FIG. 2 is a perspective view illustrating a main part of the cooking appliance according to the first embodiment.
Figure 3:
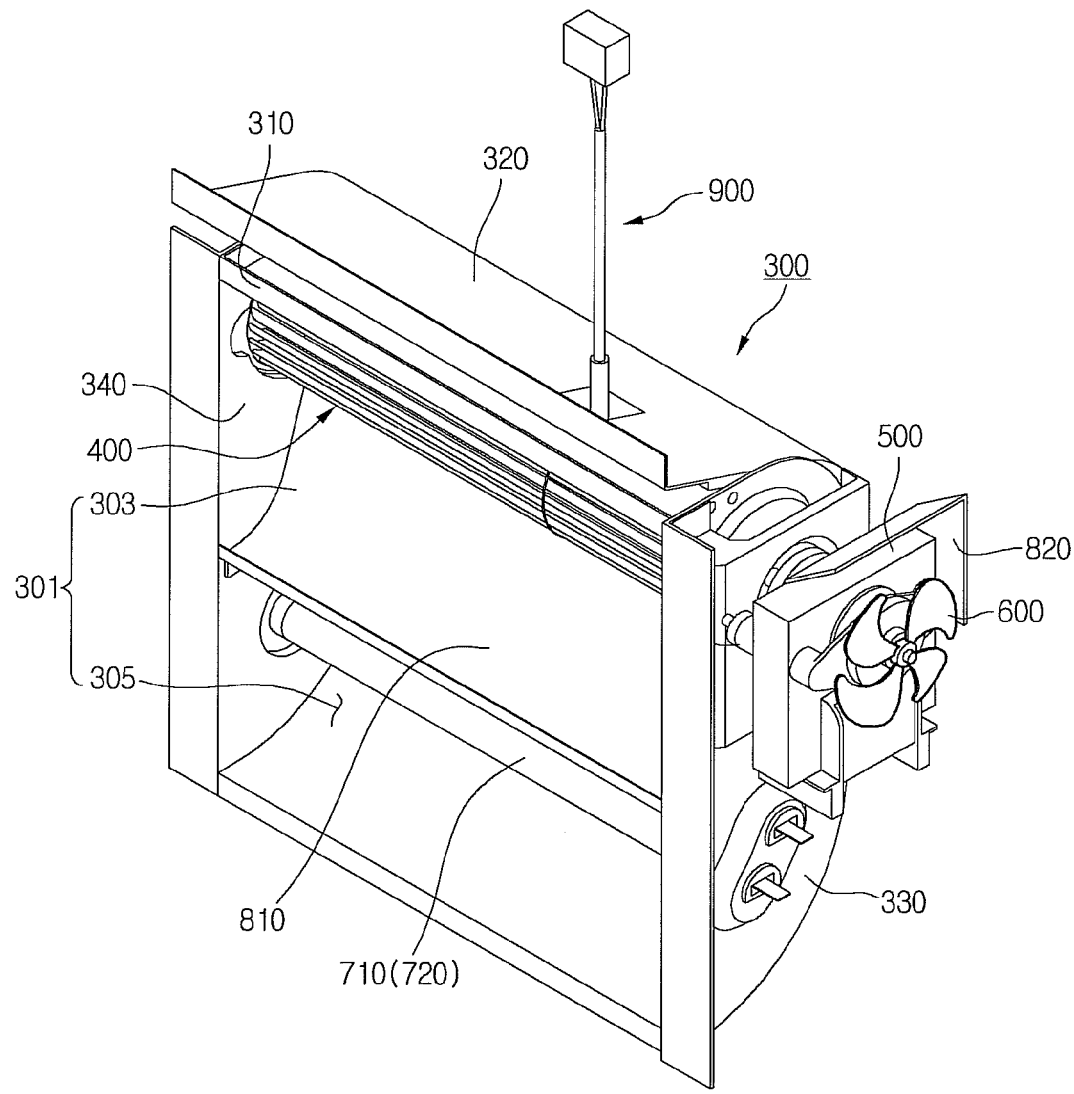
FIG. 3 is a perspective view of a convection device according to the first embodiment.
Figure 4:
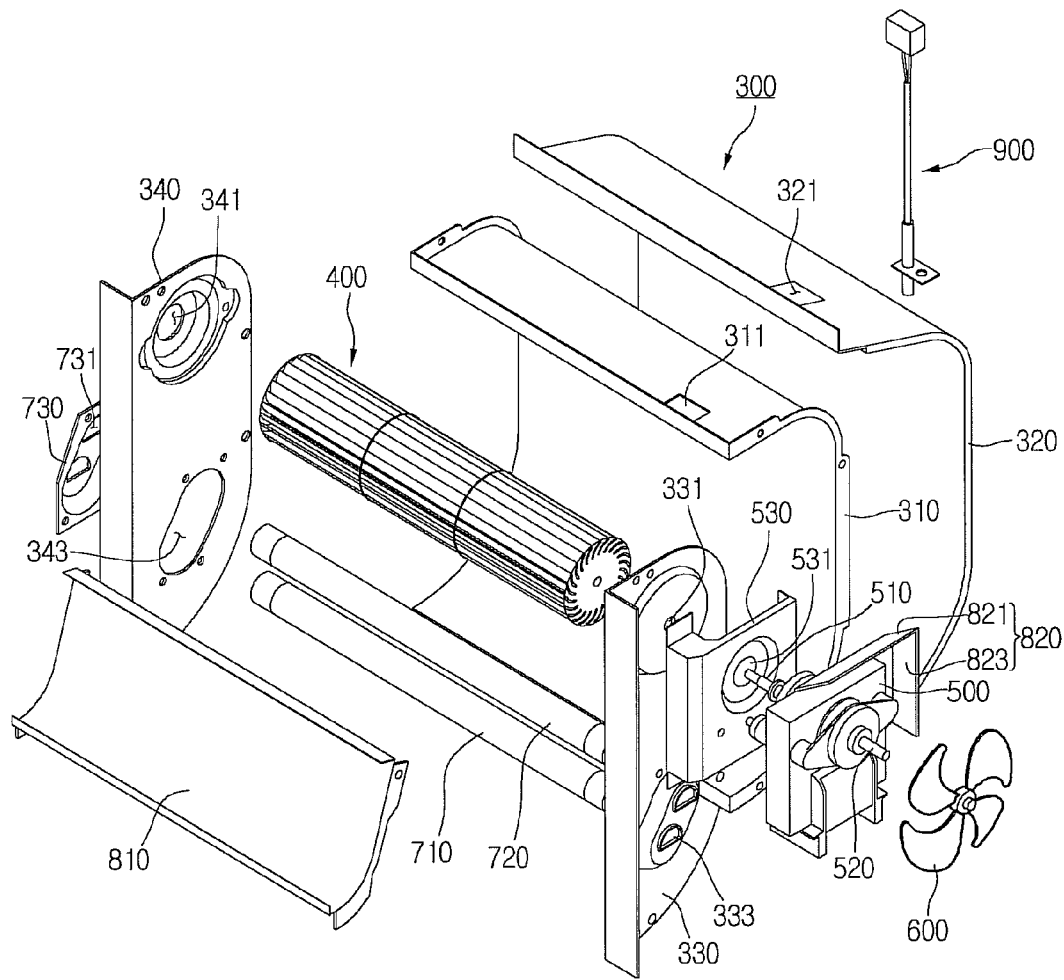
FIG. 4 is an exploded perspective view of the convection device according to the first embodiment.
Figure 5:
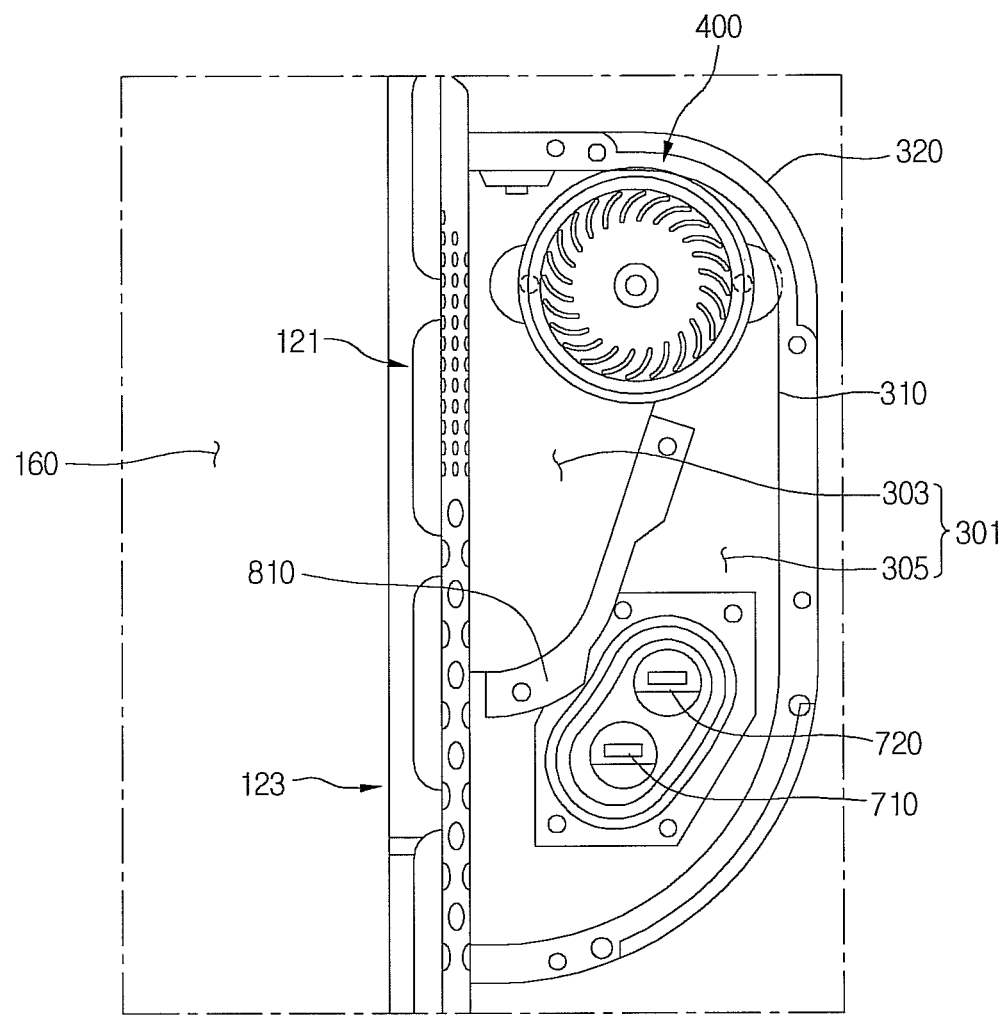
FIG. 5 is a sectional view of the convection device according to the first embodiment.
Figure 6:
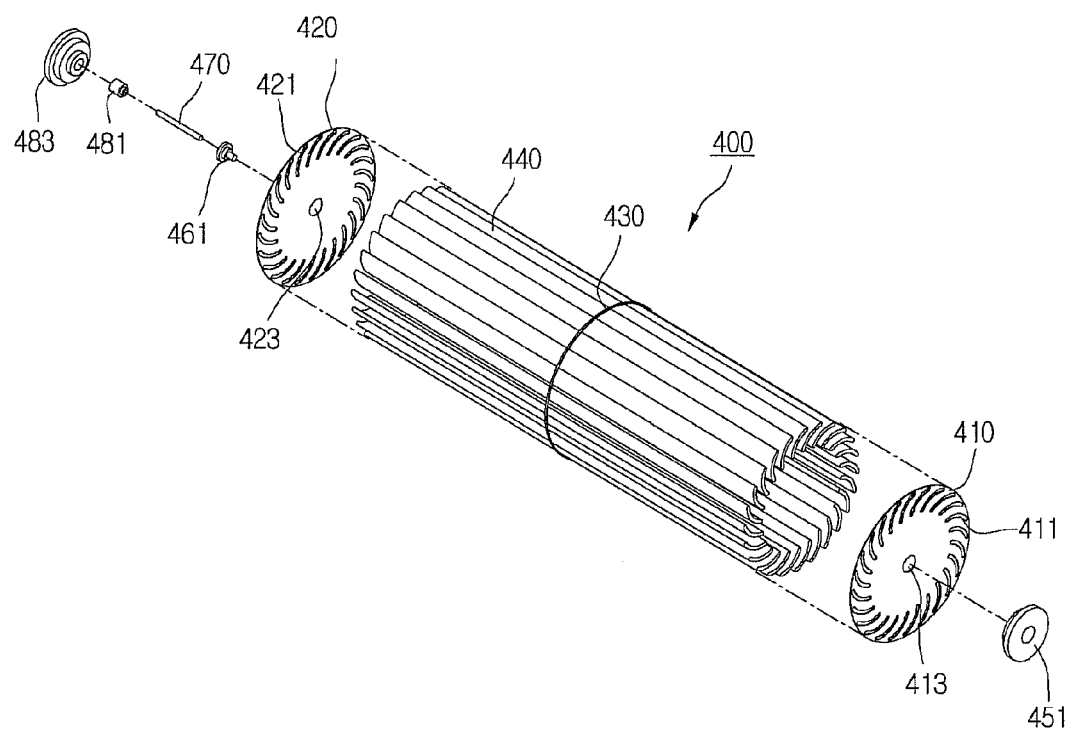
FIG. 6 is an exploded perspective view of a convection fan according to the first embodiment.

FIG. 1 is a perspective view of a cooling appliance according to a first embodiment. FIG. 2 is a perspective view illustrating a main part of the cooking appliance according to the first embodiment. FIG. 3 is a perspective view of a convection device according to the first embodiment. FIG. 4 is an exploded perspective view of the convection device according to the first embodiment. FIG. 5 is a sectional view of the convection device according to the first embodiment. FIG. 6 is an exploded perspective view of a convection fan according to the first embodiment.

Referring to FIG. 1, a front plate 110 defines a front surface of a cavity 100 of a microwave oven and a back plate 120 defines a rear surface of the cavity 100. Also, upper and bottom plates 130 and 140 define on top and bottom surfaces of the cavity 100, respectively. Also, two side plates 150 define both side surfaces of the cavity 100.

A cooking chamber 160 is disposed within the cavity 100. Substantially, the cooking chamber 160 has a hexahedron shape with a front surface opened. Also, a back plate 120, an upper plate 130, a bottom plate 140, and a side plate 150 define a rear surface, top and bottom surfaces, and both side surfaces of the cooking chamber 160. The cooking chamber 160 provides a space for cooking foods. The cooking chamber 160 is selectively opened or closed by a door (not shown).

A machining room 170 is defined in a side of the cavity 100. Various electric components are installed inside the machining room 170. Although the machining room 170 is disposed at a left side when viewed in FIG. 1, the machining room 170 is not limited to its position. For example, the machining room 170 may be disposed above the cooking chamber 160.

An intake hole 121 (see FIG. 2) and an exhaust hole 123 (see FIG. 2) are defined in a rear surface, i.e., the back plate 120 of the cooking chamber 160. The intake hole 121 may serve as an inlet through which air within the cooking chamber 160 is sucked into the convection chamber 301 that will be described later. The exhaust hole 123 may serve as an outlet through which air within the convection chamber 301 is discharged into the cooking chamber 160. In the current embodiment, the exhaust hole 123 is defined under the intake hole 121. Also, each of the intake hole 121 and the exhaust hole 123 may include a porous part. This is done because it prevent the microwave supplied into the cooking chamber 160 from leaking and also prevents foreign substances generated in a process of cooking foods within the cooking chamber 160 from flowing into the convection chamber.

A back cover 180 is installed on a rear surface of the back plate 120. The back cover 180 covers a convection cover 300 that will be described later. In the current embodiment, the back cover 180 may have an approximately polyhedron shape with a front surface opened. Also, a cooling intake hole 181 (see FIG. 8) is defined in a right surface of the back cover 180 when viewed in FIG. 8. Also, a cooling exhaust hole 183 (see FIG. 8) is defined in a left surface of the back cover 180 when viewed in FIG. 8. The cooling intake hole 181 and the cooling exhaust hole 183 may be an inlet and outlet through which air for cooling the convection motor 500 that will be described later are sucked or discharged. In the current embodiment, the cooling intake hole 181 may be disposed in an upper end of a right surface of the back cover 180 in FIG. 1 at which the cooling intake hole 181 is disposed relatively adjacent to the convection motor 50. Also, the cooling exhaust hole 183 may be disposed in a lower end of a left surface of the back cover 180 in FIG. 1 at which the cooling exhaust hole 183 is relatively spaced from the convection motor 500.

The microwave oven includes a plurality of heating sources for cooking foods within the cooking chamber 160. For example, a magnetron (not shown) for supplying a microwave into the cooking chamber 160 may be installed in the machining room 170. Also, an upper heater 200 for supplying heat into the cooking chamber 160 may be installed on the upper plate 130.

In the current embodiment, a convection device is installed on a rear side of the cooking chamber 160, i.e., a rear surface of the back plate 120. The convection device may supply high-temperature air into the cooking chamber 160. Referring to FIGS. 3 to 6, the convection device includes the convection cover 300, the convection fan 400, the convection motor 500, a cooling fan 600, convection heaters 710 and 720, and first and second air guides 810 and 820.

In detail, the convection cover 300 may be fixed to a rear surface of the back plate 120 to define the convection chamber 301. Here, the convection cover 300 may be disposed between the back plate 120 and the back cover 180. The convection chamber 301 provides a space in which the convection fan 400, the convection heaters 710 and 720, and the first air guide 810 are installed. Substantially, the convection chamber 301 may communicate with the cooking chamber 160 through the intake hole 123 and the exhaust hole 123. The convection cover 300 includes an inner cover 310, an outer cover 320, and two side covers 330 and 340.

Substantially, the inner cover 310 and the outer cover 320 may define surfaces remaining except for front surface and both side surfaces of the convection cover 300. For example, each of the inner cover 310 and the outer cover 320 may have an approximately U shape in section. Also, the inner cover 310 and the outer cover 320 may be fixed to the rear surface of the back plate 120. Thus, the outer cover 320 may cover the front and rear sides of the inner cover 310. Also, thermistor installation holes 311 and 321 are defined in the inner cover 310 and the outer cover 320, respectively. The thermistor installation holes 311 and 321 may vertically overlap each other. Substantially, the thermistor installation holes 311 and 321 may be defined by cutting portions of the inner and outer covers 310 and 320 corresponding to front and upper sides when compared to first and second fan installation holes 331 and 341 that will be described later.

Although not shown, an insulation material may be disposed between the inner cover 310 and the outer cover 320. The insulation material may prevent heat of the convection heaters 710 and 720 from being transmitted to the outside.

The side covers 330 and 340 are fixed to a side surface of the inner cover 310. Hereinafter, for convenience of description, a side cover disposed at a right side when viewed in FIG. 3 will be referred to as a first side cover 330, and a side cover disposed at a left side when viewed in FIG. 3 will be referred to as a second side cover 340.

The first fan installation hole 331 and the two heat installation holes 333 are defined in the first side cover 330. The first fan installation hole 331 may be configured to install the convection fan 400. The first heater installation hole 333 may be configured to install the convection heaters 710 and 720.

The first heater installation hole 333 may have a shape corresponding to that of each of pinch parts of the convection heaters 710 and 720, e.g., a D shape so that the pinch parts of the convection heaters 710 and 720 are inserted therein. Each of the first fan insulation hole 331 and the first heater installation hole 333 may be defined by cutting a portion of the first side cover 330. Here, the first fan installation hole 331 may be disposed relatively adjacent to the intake hole 121 when compared to the exhaust hole 123. Also, the first heater installation hole 333 may be disposed relatively adjacent to the exhaust hole 123 when compared to the intake hole 121. Thus, the first heater installation hole 333 may be disposed under the first fan installation hole 331.

A second fan installation hole 341 and a heater installation opening 343 are defined in the second side cover 340. The second fan installation hole 341 may be disposed facing the first fan installation hole 331. Like the first fan installation hole 331, the second fan installation hole 341 may be configured to install the convection fan 400. Also, the heater installation opening 343 may be configured to install the convection heaters 710 and 720. A heater bracket 730 that will be described later is fixed to the heater installation opening 343. The heater installation opening 343 may be defined by cutting the second side cover 340 by a size greater than an area in which the heater installation opening 343 horizontally overlaps the first heater installation hole 333.

The convection fan 400 may be installed inside the convection chamber 301 to circulate air between the cooking chamber 160 and the convection chamber 301. In the current embodiment, the convection fan 400 is rotated with respect to a horizontal rotation shaft. In more detail, when the convection fan 400 is operated, air within the cooking chamber 160 is sucked into the convection chamber 301 through the intake hole 121 and air within the convection chamber 301 is discharged into the cooking chamber 160 through the exhaust hole 123.

In the current embodiment, a cross flow fan in which air is sucked or discharged in a plane direction perpendicular to that of its rotation shaft may be used as the convection fan 400. Referring to FIG. 6, the convection fan 400 includes three disks 410, 420, and 430 and a plurality of blades 440 disposed between the disks 410, 420, and 430. Each of the disks 410, 420, and 430 may have an approximately disk shape, and the disks 410, 420, and 430 are spaced a predetermined distance from each other. Hereinafter, for convenience of description, a disk disposed at a right side when viewed in FIG. 6 will be referred to as a first disk 410, a disk disposed at a left side when viewed in FIG. 6 will be referred to as a second disk 420, and a disk disposed between the first and second disks 410 and 420 will be referred to as a third disk 430. The blades 440 may be disposed inclined at a predetermined angle between the first and second disks 410 and 420 and between the second and third disks 420 and 430, respectively.

A plurality of blade fixing holes 411 and 421 for fixing the blades 440 are defined in the first and second disks 410 and 420, respectively. The blade fixing holes 411 and 421 are disposed on edge portions of the first and second disks 410 and 420. Here, the blade fixing holds 411 and 412 may be spaced a predetermined distance from each other in a circumference direction of the first and second disks 410 and 420.

Also, first and second coupler fixing holes 413 and 423 are defined in the first and second disks 410 and 420, respectively. First and second couplers 451 and 461 (that will be described later) for fixing the convection fan 400 to a first motor shaft 510 and a fan shaft 470 which will be described later are fixed to the first and second coupler fixing holes 413 and 423. The first and second coupler fixing holes 413 and 423 may be defined by cutting a portion of a central portion of the first disk 410.

The first and second couplers 451 and 461 are inserted and fixed in/to both sides of the convection fan 400, i.e., the first and second coupler fixing holes 413 and 423. The first coupler 451 is coupled to the first motor shaft 510, and the second coupler 461 is coupled to the fan shaft 470. Each of the first and second couplers 451 and 461 may be formed of a rubber material having predetermined elasticity. Also, each of the first and second couplers 451 and 461 may have a sectional area greater than that of each of the first and second coupler fixing holes 413 and 423. Thus, the first and second couplers 451 and 461 may be forcibly inserted into the first and second coupler fixing holes 413 and 423, respectively.

The fan shaft 470 may extend outward from the convection chamber 301, i.e., the second side cover 340 in a state where the fan shaft 470 is coupled to the second coupler 461. Also, the fan shaft 470 extending outward from the second side cover 340 may be fixed to a bearing 481. The bearing 481 may be rotatably supported by a bearing housing 483 fixed to an outer surface of the second side cover 340.

Referring again FIGS. 3 and 4, the convection motor 500 may provide a driving force for rotating the convection fan 400 and a cooling fan 600. For this, motor shafts 510 and 520 are disposed on the convection motor 500. Each of the motor shafts 510 and 520 may extend in both directions of the convection motor 500. Hereinafter, a motor shaft extending in a left direction of FIG. 4 will be referred to as a first motor shaft 510, and a motor shaft extending in a right direction of FIG. 3 will be referred to as a second motor shaft 520. Substantially, the first and second motor shafts 510 and 520 may constitute one shaft. The first motor shaft 510 may pass through the first fan installation hole 331 to extend into the convection chamber 301. The first motor shaft 510 is coupled to the first coupler 451. Also, the second motor shaft 520 may extend in a direction away from the convection chamber 301.

The convection motor 500 is fixed to the outside of the convection chamber 301, i.e., an outer surface of the first side cover 330. Here, the convection motor 500 is fixed to the outer surface of the first side cover 330 by the motor bracket 530. Substantially, a shaft through-hole 531 through which the first motor shaft 510 passes may be defined in the motor bracket 530.

The cooling fan 600 may blow air to cool the convection motor 500. In the current embodiment, an axial fan may be used as the cooling fan 600. Also, the cooling fan 600 is coupled to the second motor shaft 520. Thus, the cooling fan 600 may be disposed upstream from the convection motor 500 in a direction in which air sucked \through the cooling intake hole 181 flows.

The convection heaters 710 and 720 may heat air discharged from the inside of the convection chamber 301 to the inside of the cooking chamber 160 due to the rotation of the convection fan 400. That is, the convection heaters 710 and 720 may be heating sources for heating the air flowing by the convection fan 400. The convection heaters 710 and 720 may be disposed downstream from the convection fan 400 on a flow of air flowing by the convection fan 400. This is done because it prevents the convection fan 400 from being damaged by the air heated by the convection heaters 710 and 720.

In the current embodiment, the two convection heaters 710 and 720 are installed inside the convection chamber 301. Also, for example, one of a bar-type carbon heater, a ceramic heater, and a halogen heater may be used as the convection heaters 710 and 720. One ends of the convection heaters 710 and 720, i.e., one of the pinch parts of the convection heaters 710 and 720 may be inserted into the first heater installation hole 333. Also, the other ends of the convection heaters 710 and 720, i.e., the other one of the pinch parts of the convection heaters 710 and 720 may be supported by the heater bracket 730.

The heater bracket 730 may support the other one of the pinch parts of the convection heaters 710 and 720. For this, two second heat installation holes 731 may be defined in the heater bracket 730. The second heater installation holes 731 may be defined in a position corresponding to that of the first heater installation hole 333. The other ends of the convection heaters 710 and 720, i.e., the other one of the pinch parts of the convection heaters 710 and 720 may be inserted into the second heater installation hole 731. The heater bracket 730 is fixed to the second side cover 340 in a state where the heater bracket 730 covers the heater installation opening 343.

Substantially, the first air guide 810 may partition the inner space of the convection chamber 301 into an area 303 in which air sucked form the inside the cooking chamber 160 to the convection chamber 301 flows (hereinafter, referred to as a "suction area") and an area 305 in which air discharged from the inside of the convection chamber 301 to the inside of the cooking chamber 160 flows (hereinafter, referred to as a "discharge area"). Also, the first air guide 810 may guide air circulating the inside of the cooking chamber 160 and the inside of the convection chamber 301 due to the rotation of the convection fan 400 so that the air is uniformly circulated inside the cooking chamber 160.

Referring to FIG. 5, one end of the first air guide 810 may contact a rear surface of the back plate 120 corresponding between the intake hole 121 and the exhaust hole 123. In the current embodiment, a front end of the first air guide 810 may contact the rear surface of the back plate 120 corresponding to a direct upper side of the exhaust hole 123.

The other end of the first air guide 810 may be disposed adjacent to the convection fan 400. Also, the first air guide 810 may partition the suction area 303 and the discharge area 305 so that the first air guide 810 is bent at a predetermined curvature to increase a flow area of the discharge area 305 in a direction in which the air flows. That is, the first air guide 810 may partition the inside of the convection chamber 301 so that a flow area of the discharge area 305 is increased from the convection fan 400 toward the exhaust hole 123.

Referring again FIG. 4, the second air guide 820 may guide air for cooling the convection motor 500 due to the rotation of the cooling fan 600. That is, the second air guide 820 may guide air sucked through the cooling intake hoe 181 so that the air cools the convection motor 500 and is discharged through the cooling exhaust hole 183. This is done for a reason air sucked into a space between the back cover 180 and the convection cover 300 through the cooling intake hole 181 due to the rotation of the cooling fan 600 flows into a space between an upper portion of the back cover 180 corresponding to an upper side of the convection motor 500 and the upper portion of the convection motor 300 to prevent the convection motor 500 from being inefficiently cooled.

In the current embodiment, the second air guide 820 may have an approximately "⌐" shape to substantially surround upper and rear sides of the cooling fan 600. Hereinafter, for convenience of description, a portion of the second air guide 820 which is horizontally disposed will be referred to as a horizontal part 821, and a portion of the second air guide 820 which is vertically disposed will be referred to as a vertical part 823. Also, one end of the second air guide 820, i.e., an end of a side of the horizontal part 821 and an end of a side of the vertical part 823 are fixed to the motor bracket 530. Here, the second air guide 820 may be fixed to an outer surface of the first side cover 330 according to a shape and size of the motor bracket 530. The horizontal part 821 may contact the rear surface of the back plate 120. Thus, the air may be guided into a space between the rear surface of the back plate 120 and an inner surface of the second air guide 820 (substantially, a bottom surface of the horizontal part 821 and a front surface of the vertical part 823).

The second air guide 820 may inclinedly extend upward and backward from the motor bracket 530 toward the cooling intake hole 181. That is, the horizontal part 821 may inclinedly extend upward from the motor bracket 530 toward the cooling intake hole 181, and the vertical part 823 may inclinedly extend backward from the motor bracket 530 toward the cooling intake hole 181. That is, a flow area of a space in which air sucked through the cooling intake hole 181 flows may be substantially decreased to guide air sucked into a space between the back cover 180 and the convection cover 300 through the cooling intake hole 181 toward the convection motor 500 by the second air guide 820.

Also, the air cooling the convection motor 500 may flow downward along the first side cover 330. Thus, when the air is discharged through the cooling exhaust hole 183, the air may flow into a space between the back cover 180 adjacent to the convection heaters 710 and 720 and the convection cover 300. Thus, the convection heaters 710 and 720 may be indirectly cooled by the air cooling the convection motor 500. Alternatively, the air cooling the convection motor 500 may serve as an air curtain which prevents heat of the convection heaters 710 and 720 from being transmitted to the outside.

A thermistor 900 for detecting a temperature may be installed in the thermistor installation holes 311 and 321. Substantially, the thermistor 900 may be disposed between the intake hole 121 and the convection fan 400. That is, the thermistor 900 may be disposed upstream from the convection fan 400 in a flow direction of air sucked from the cooking chamber 160 into the convection chamber 301 through the intake hole 121. Thus, the thermistor 900 may detect a temperature of the air sucked from the cooking chamber 160 into the convection chamber 301 through the intake hole 121.

A front end of the thermistor 900 may be disposed between a rotation shaft of the convection fan 400 and an upper end of an inner surface of the inner cover 310. This is done for a reason in which the thermistor 900 is disposed on a position at which a relatively large amount of air flows in consideration of a flow amount of air sucked from the inside of the cooking chamber to the inside of the convection chamber 301. In more detail, since the intake hole 121 and the exhaust hole 123 are vertically spaced from each other, the air discharged from the inside of the convection chamber 301 to the inside of the cooking chamber 160 through the exhaust hole 123 may flow along a bottom surface, a front surface (substantially, a back surface of the door), and a ceiling of the cooking chamber 160. Thus, an amount of air flowing into a portion corresponding to an upper side of the rotation shaft of the convection fan 400 may be relatively larger than that of air flowing into a portion corresponding to a lower side of the rotation shaft of the convention fan 400, based on the rotation shaft of the convention fan 400. In the current embodiment, since a front end of the thermistor 900 is disposed above the rotation shaft of the convention fan 400 with respect to the rotation shaft of the convention fan 400, the thermistor may more precisely detect a temperature.

Hereinafter, an operation of the cooking appliance according to the first embodiment will be described in detail with reference to accompanying drawings.

Figure 7:
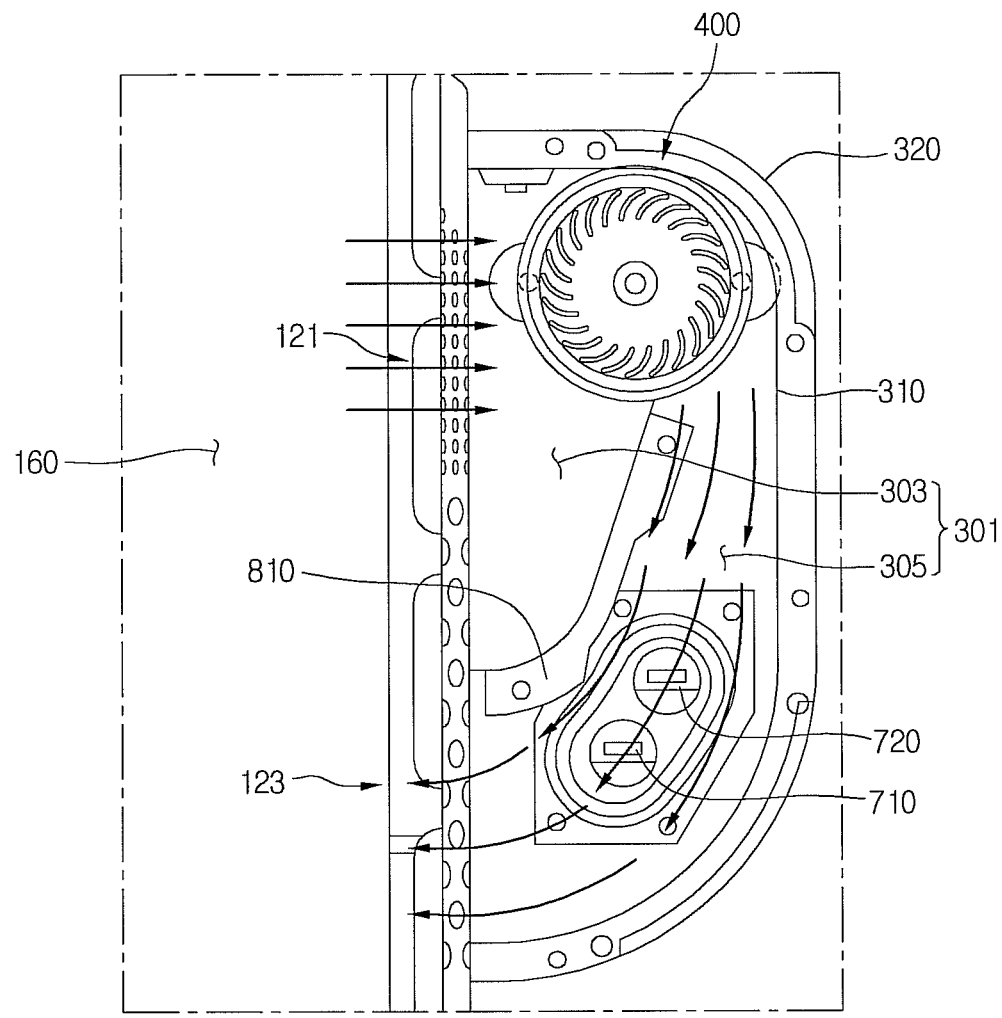
FIG. 7 is a side view illustrating an airflow between a cooking chamber and a convection chamber in the cooking appliance according to the first embodiment.
Figure 8:
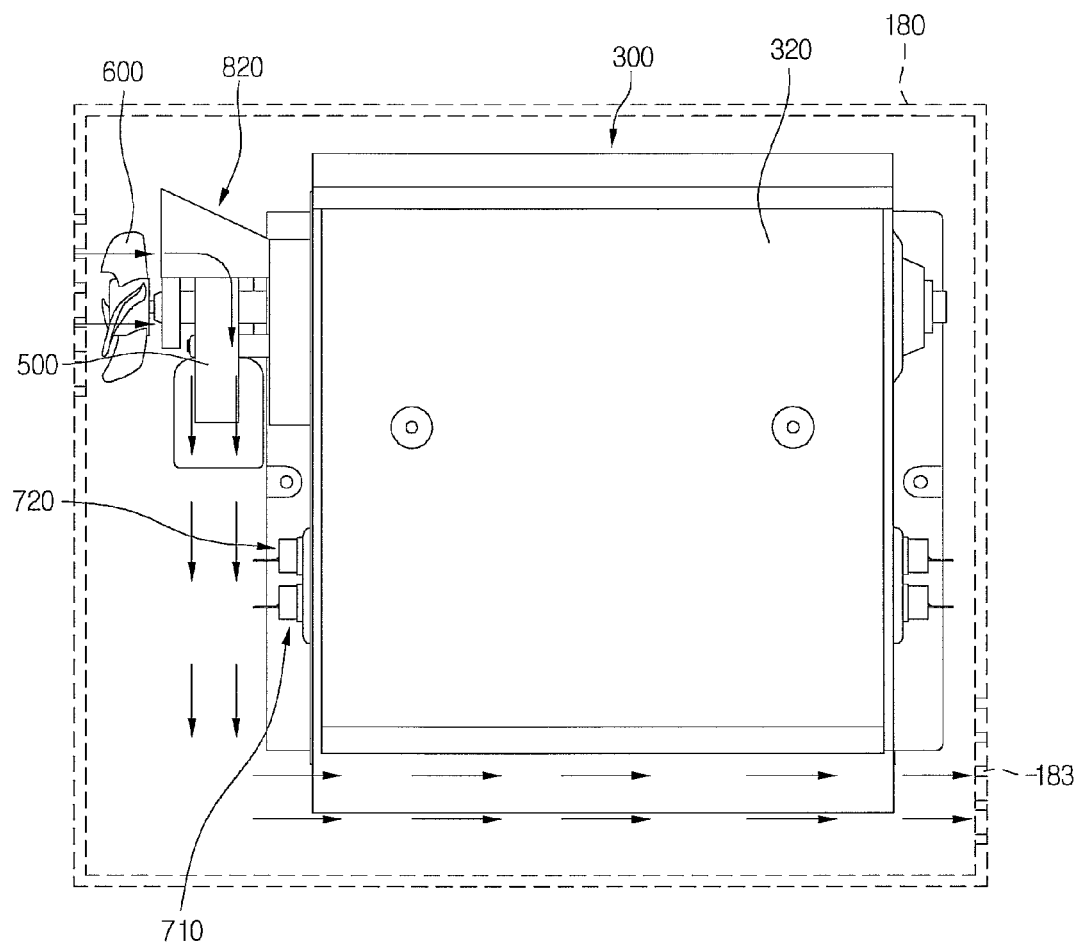
FIG. 8 is a bottom view illustrating an airflow for cooling a convection motor of the cooking appliance according to the first embodiment.

FIG. 7 is a side view illustrating an airflow between a cooking chamber and a convection chamber in the cooking appliance according to the first embodiment. FIG. 8 is a bottom view illustrating an airflow for cooling a convection motor of the cooking appliance according to the first embodiment.

Referring to FIG. 7, various heating sources may be operated to cook foods within the cooking chamber 160. That is, a microwave oscillated in the magnetron or/and heat of the upper heater 200 may be supplied into the cooking chamber 160 to cook the foods.

When the convection device is operated in the process of cooking the foods within the cooking chamber 160, air within the cooking chamber 160 may be sucked into the convection chamber 301, i.e., the suction area 303 through the intake hole 121 due to the rotation of the convection fan 400. The air sucked into the suction area 303 may be discharged into the cooking chamber 160 through the exhaust hole 123 after the air flows into the discharge area 305 by the continuous rotation of the convention fan 400.

Here, the air sucked from the cooking chamber 160 to the convection chamber 301 through the intake hole 121 and the air discharged from the convection chamber 301 to the cooking chamber 160 through the exhaust hole 123 may be partitioned by the first air guide 810. Also, the air discharged from the convection chamber 301 to the cooking chamber 160 through the exhaust hole 123 may be guided by the first air guide 810 and thus uniformly circulated into the cooking chamber 160. Also, since the air discharged into the cooking chamber 160 is heated by the convection heaters 710 and 720 while flowing into the discharge area 305, high-temperature air may be supplied into the cooking chamber 160 to heat the foods.

Referring to FIG. 8, when the convection motor 500 is operated to rotate the convection fan 400, the cooling fan 600 coupled to the second motor shaft 520 may be rotated to cool the convention motor 500. In more detail, when the cooling fan 600 is rotated, external air may be sucked into a space between the back cover 180 on which the convection motor 500 and the convection cover 300 through the cooling intake hole 181. The air sucked into the space between the back cover 180 and the convection cover 300 may be guided by the second air guide 820 to cool the convection motor 500. The air cooling the convection motor 500 may flow downward along the first side cover 330 due to the continuous rotation of the cooling fan 600, and then horizontally flow along the space between the back cover 180 and the convection cover 300, thereby being discharged from the outsides to the insides of the back cover 180 and the convection cover 300 through the cooling exhaust hole 183. Here, the air discharged through the exhaust hole 123 may substantially flow into a lower portion of the space between the back cover 180 adjacent to the convection heaters 710 and 720 and the convection cover 300 to indirectly cool the convection heaters 710 and 720 or perform an air curtain which prevents the heat of the convection heaters 710 and 720 from being transmitted to the outside. Thus, the heat of the convection heaters 710 and 720 may be minimally transmitted to the outside to realize more safety products.

Figure 9:
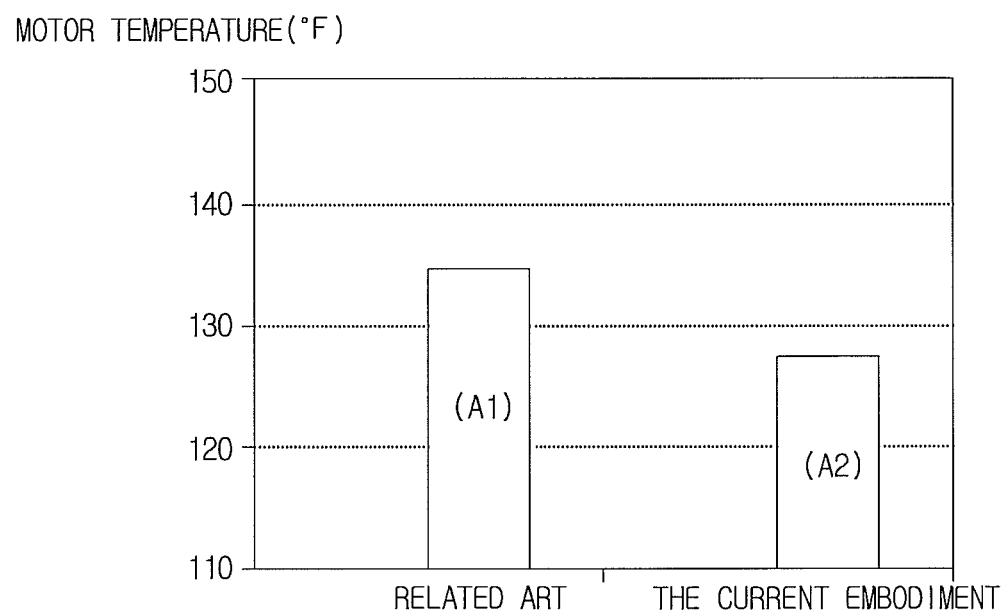
FIG. 9 is a graph illustrating a temperature difference depending on whether a second air guide exists in the cooking appliance according to the first embodiment.

Referring to FIG. 9, in case of a related art in which the second air guide 820 is not provided, the convention motor 500 is increased at a temperature of about 134.7° F. However, in case where the second air guide 820 is provided, the convection motor 500 may have a temperature of about 127.3° F. That is, when the air for cooling the convection motor 500 is guided by the second air guide 820, the convection motor 500 may be more effectively cooled. Thus, the operation reliability of the convection motor 500 may be improved, and also, reliability of durability of the product may be improved.

The operation of the heating source including the convection device may be controlled according to the temperature detected by the thermistor 900. That is, the temperature detected by the thermistor 900 may be determined as a temperature within the cooking chamber 160 to control the operation of the heating source. Thus, when the temperature detected by the thermistor 900 approaches the temperature within the cooking chamber 160, the operation of the heating source may be more precisely controlled.

Figure 10:
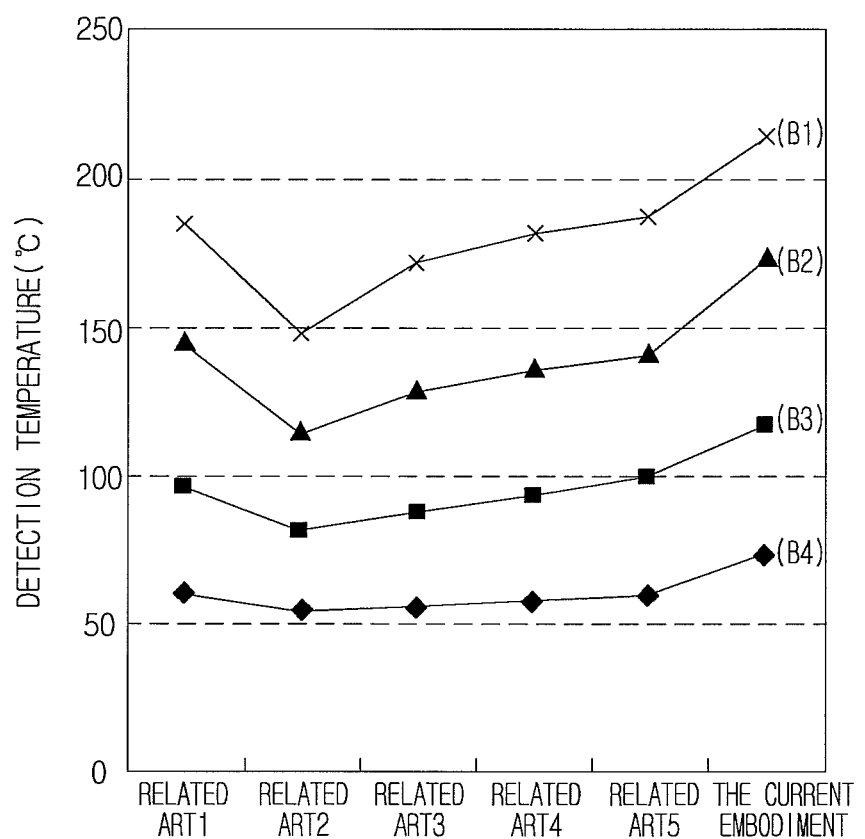
FIG. 10 is a graph illustrating a temperature difference detected by a thermistor depending on a position thereof in the cooking appliance according to the first embodiment.

Referring to FIG. 10, in the current embodiment, when the thermistor 900 detects a temperature of the inside of the convection chamber 301, i.e., a temperature of the air sucked from the cooking chamber 160 to the convection chamber 301 through the intake hole 121, a temperature approaching the preset temperature of the cooking chamber 160 may be detected. In more detail, related arts 1 to 5 of FIG. 10 illustrate cases in which the thermistor 900 is installed inside the cooking chamber 160. That is, the related art 1 illustrates a case in which the thermistor 900 is installed at a center of an upper end of a rear surface of the cooking chamber 160. The related arts 2 to 5 illustrate cases in which the thermistor 900 is installed at a rear end of an upper end of a side surface of the cooking chamber 160 or spaced from the rear end of the upper end of the side surface of the cooking chamber 160. Lines B1 to B4 illustrate temperatures detected by the thermistor 900 according to a set temperature of the cooking chamber 160 in the current embodiment and the related art. That is, when the lines B1 to B4 illustrate temperatures detected by the thermistor 900 when set temperatures are about 230° C., about 200° C., about 150° C., and about 100° C., respectively, in the current embodiment and the related art. Referring to the lines B1 to B4, it is seen that the thermistor 900 detects a temperature most approaching the set temperature of the cooking chamber 160 in the current embodiment when compared to the related art. Furthermore, according to the current embodiment, the heating source may be more precisely controlled based on the temperature detected by the thermistor 900.

Hereinafter, a cooking appliance according to second and third embodiments will be described in detail with reference to accompanying drawings.

Figure 11:
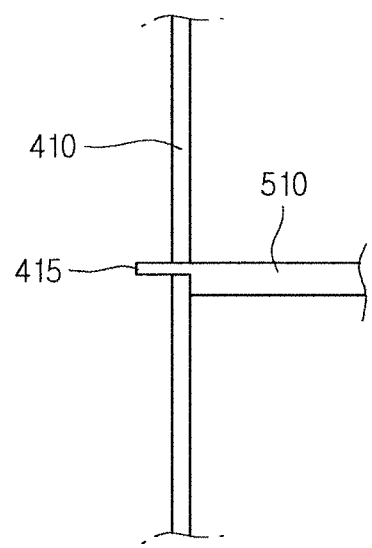
FIG. 11 is a sectional view illustrating a main part of a cooking appliance according to a second embodiment.
Figure 12:
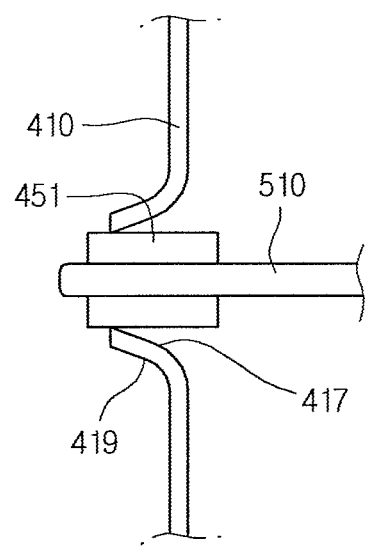
FIG. 12 is a sectional view illustrating a main part of a cooking appliance according to a third embodiment.

FIG. 11 is a sectional view illustrating a main part of a cooking appliance according to a second embodiment. FIG. 12 is a sectional view illustrating a main part of a cooking appliance according to a third embodiment. Here, the fundamentally same portions as those of the above first embodiment are denoted by the same reference numerals as those of FIGS. 1 to 8 and their detained descriptions will be omitted.

Referring to FIG. 11, in the second embodiment, a first shaft fixing hole 415 is defined in a center of a first disk 410. The first shaft fixing hole 415 has a "D" shape. Also, a first motor shaft 510 may have a shape corresponding to that of the first shaft fixing hole 415. Here, the first motor shaft 510 may have a size less than that of the first shaft fixing hole 415. Thus, a driving force of a convection motor 500 may be transmitted into a convection fan 400 without using a separate coupler. Here, the first shaft fixing hole 415 is not limited to the "D" shape. For example, if the driving force of the convection motor 500 can be transmitted to the convection fan 400, the first shaft fixing hole 415 may have various shapes.

As described above, since a coupler may be formed of a rubber material, the coupler is weak in heat. However, in the current embodiment, since the coupler is removed and the first motor shaft 510 is inserted into the first shaft fixing hole 415, operation reliability of the product may be further improved.

Referring to FIG. 12, in the third embodiment, a first coupler fixing hole 417 is defined in a center of the first disk 410.

A first elastic support part 419 may be disposed on an inner circumference of the first coupler fixing hole 417. The first elastic support part 419 may inclinedly extend at a preset angle, i.e., an angle greater than an obtuse angle with respect to the first disk 410 on the inner circumference of the first coupler fixing hole 417. Here, the first elastic support part 419 extends toward the inside of the convection fan 400. In other words, the first elastic support part 419 may extend in a direction in which one end of the first motor shaft 510 is inserted.

Also, a first coupler 451 inserted into the first coupler fixing hole 417 is elastically supported by the first elastic support part 419. Thus, although the first coupler 451 has a sectional area less than that of the first coupler fixing hole 417 in a direction perpendicular to that in which the first coupler 451 is inserted into the first coupler fixing hole 417, that is to say, although the first coupler 451 is not forcibly inserted into the first coupler fixing hole 417, the first coupler 451 may be supported by the first elastic support part 419. However, the first coupler 451 should have a sectional area on which at least one portion of the first coupler 451 contacts the first elastic support part 419 in a direction perpendicular to that in which the coupler 451 is inserted into the first coupler fixing hole 417 in a state where the first coupler 451 is inserted into the first coupler fixing hole 417. Thus, even though the first coupler 451 is formed of a metal material having predetermined heat-resistance and strength, the first coupler 451 may be easily coupled to the first disk 410.

Hereinafter, a method of controlling a cooking appliance according to an embodiment will be described in detail with reference to accompanying drawings.

Figure 13:
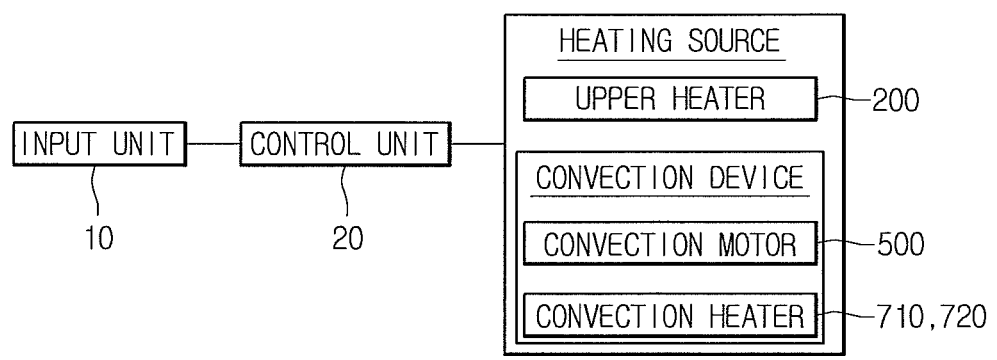
FIG. 13 is a schematic block diagram of a cooking appliance according to an embodiment.

FIG. 13 is a schematic block diagram of a cooking appliance according to an embodiment.

Referring to FIG. 13, a cooking appliance according to the current embodiment may further include an input unit 10 and a control unit 20. The input unit 10 receives a signal for cooking, i.e., a signal for controlling a heating source including an upper heater 200 and a convection device. Here, the control of the convection device may represent control of a convection motor 500 and convection heaters 710 and 720. Also, the control unit 20 controls an operation of the heating source according to the signal received through the input unit 10.

Hereinafter, a method of controlling a cooking appliance according to an embodiment will be described in detail with reference to accompanying drawings.

Figure 14:
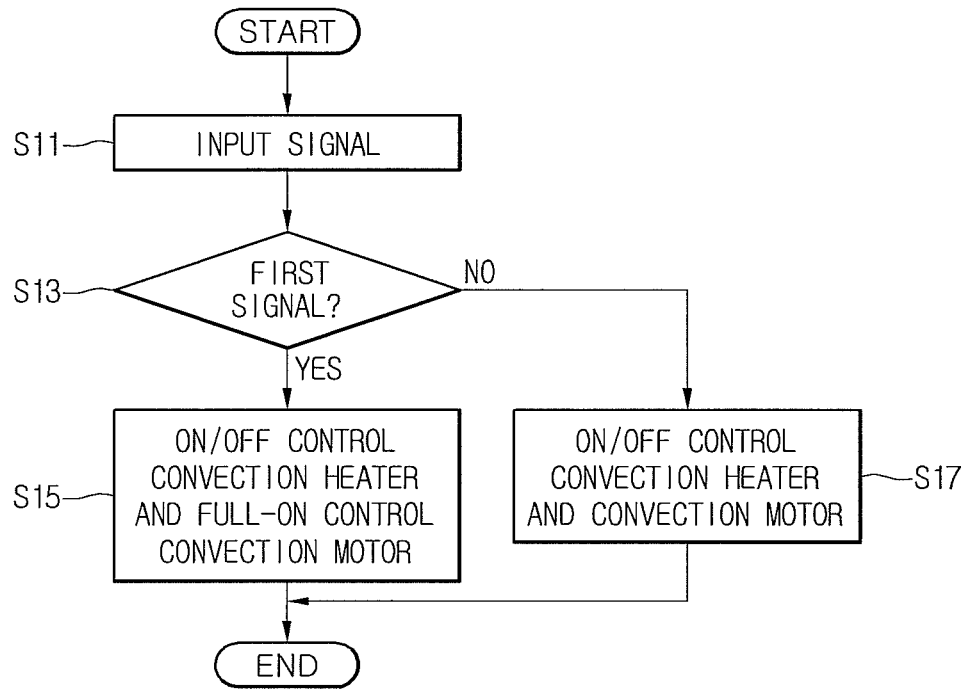
FIG. 14 is a flowchart illustrating a process of controlling a convection heater and a convection motor in a cooking appliance control method according to the first embodiment.
Figure 15:
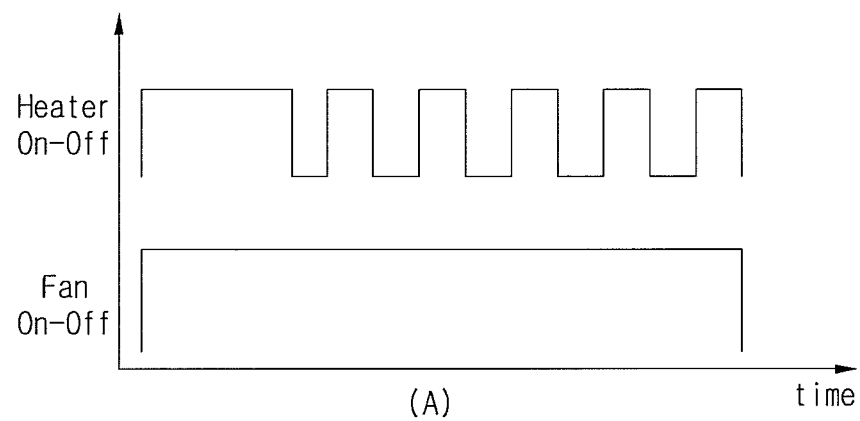
FIG. 15 is a graph illustrating ON/OFF times of the convection heater and the convection motor in the cooking appliance control method according to the first embodiment.
Figure 15:
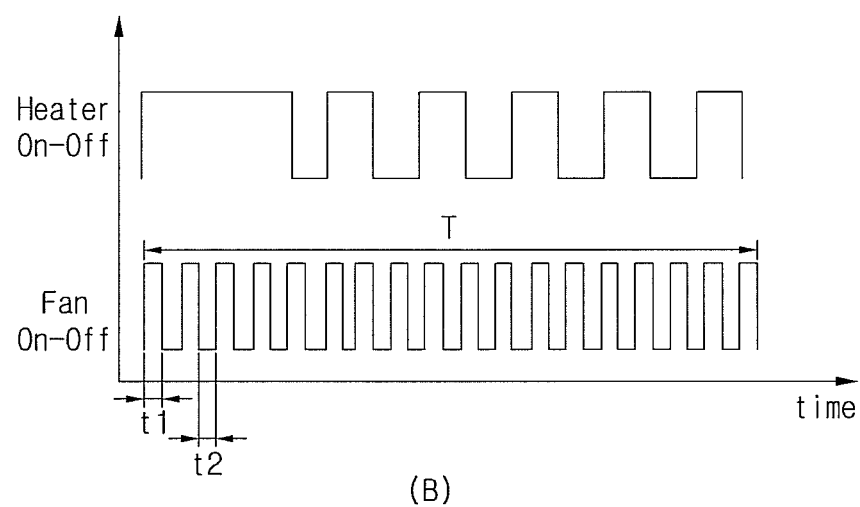

FIG. 14 is a flowchart illustrating a process of controlling a convection heater and a convection motor in a cooking appliance control method according to the first embodiment. FIG. 15 is a graph illustrating ON/OFF times of the convection heater and the convection motor in the cooking appliance control method according to the first embodiment.

Referring to FIG. 14, in operation S11, an input unit 10 receives a signal for cooking a food. Here, the input part 10 receives one signal of first and second signals. Here, the first and second signals are classified according an internal terminal of a cooking chamber 160. That is, the food may be cooked within the cooking chamber 160 at a relatively high temperature according to the first signal when compared to the second signal. That is to say, it may be understood that the first and second signals are signals for selecting a temperature value or kind of cooking inputted by a user.

For example, it may be understood that the input of the first signal represents that the inside of the cooking chamber 160 is set at a temperature greater than a preset reference temperature, and also, the input of the second signal represents that the inside of the cooking chamber 160 is set at a temperature less than the reference temperature. The reference temperature may be a temperature of about 170° C. to about 210° C., preferably, about 190° C.

Alternatively, it may be understood that the input of the first signal represents that the cooking of meat is selected and the input of the second signal represents that the cooking of bread is selected. Here, the cooking of the meat and bread is described as an example in which the inside of the cooking chamber 160 is set at temperatures different from each other. Thus, the inputs of the first and second signals do not represent the selection of the meat and bread.

In operations S13 and S14, when the input unit 10 receives the first signal, the control unit 20 controls the convection heaters 710 and 720 to repeat an ON/OFF operation for a predetermined period and the convection motor 500 to allow the convention motor 500 to be rotated at the most rotation rate. The control of the convection heaters 710 and 720 and the convection motor 500 will be more clearly understood with reference to FIG. 15A. Thus, an amount of air heated by the convection heaters 710 and 720 and supplied into the cooking chamber 160 may be maximized. As a result, an amount of heat supplied into the cooking chamber 160 may be maximized.

In operation S17, when the signal received through the input part 10 is not the first signal, i.e., in case of the second signal, the control unit 20 controls the convection heaters 710 and 720 and the convection motor 500 to repeat the ON/OFF operation for a preset period. Here, the period of the ON/OFF operation of the convection heaters 710 and 720 may be equal to that of a case in which the input unit 10 receives the first signal or an OFF time may be relatively increased. As described above, the control of the convection heaters 710 and 720 and the convection motor 500 may be illustrated in detail in FIG. 15B. Thus, when the input unit 10 receives the first signal, the internal temperature of the cooking chamber 160 may be relatively reduced. Here, an ON operation time t1 and an OFF operation time t2 of the convection motor 500 (or total operation time $(T=\Sigma t1+\Sigma t2)$ of the convection motor 500) may be set within a range that satisfies following Equations (1) and (2).

$$t1:t2=3:7 \text{ to } 7:3 \text{ (or } \Sigma t1:T=3:10 \text{ to } 7:10) \tag{1}$$

$$t2 \leq 60 \text{ sec} \tag{2}$$

1. Specifically, when a ratio of the ON operation time t1 to the OFF operation time t2 of the convection motor 500 is 2:3 (or a ratio of the total sum of the ON operation time t1 of the convection motor 500 to the total operation time T of the convection motor 500 is 2:5, foods such as bread may be very effectively cooked within the cooking chamber 160. This may be more clearly understood with reference to follow Table 1.

TABLE 1

| ON/OFF time ratio | 2:3 | 3:2 | -(full on) |
|---|---|---|---|
| Top surface browning variation | 67.91 | 63.47 | 70.56 |
| Top surface browning variation | 1.88 (66.88 ~ 68.76) | 4.08 (61.76 ~ 65.84) | 7.90 (65.08 ~ 72.98) |
| Bottom surface average browning | 49.41 | 43.45 | 45.98 |
| Bottom surface browning variation | 1.50 (48.84 ~ 50.34) | 1.32 (42.57 ~ 43.89) | 0.96 (45.62 ~ 41.58) |

TABLE 1-continued

| ON/OFF time ratio | 2:3 | 3:2 | -(full on) |
|---|---|---|---|
| Top surface-bottom surface browning variation | 19.92 | 23.27 | 27.36 |

Referring to Table 1, each number represents a digitized color. For example, a black color may be set to zero, and a white color may be set one hundred. That is, each number represents a color after the bread is cooked according to each condition. Thus, the high browning value represents that the bread is well-done. Also, the high browning variation represents that the bread is partially baked by degrees different from each other. Thus, when a ration of the ON operation time t1 to the OFF operation time t2 is 2:3, it is seen that each of the top and bottom browning variations and a variation of the top browning and the bottom browning are reduced when compared to those of other cases. This may be represented substantially as the bread is uniformed baked.

Hereinafter, a method of controlling a cooking appliance according to a second embodiment will be described in detail with reference to accompanying drawings.

Figure 16:
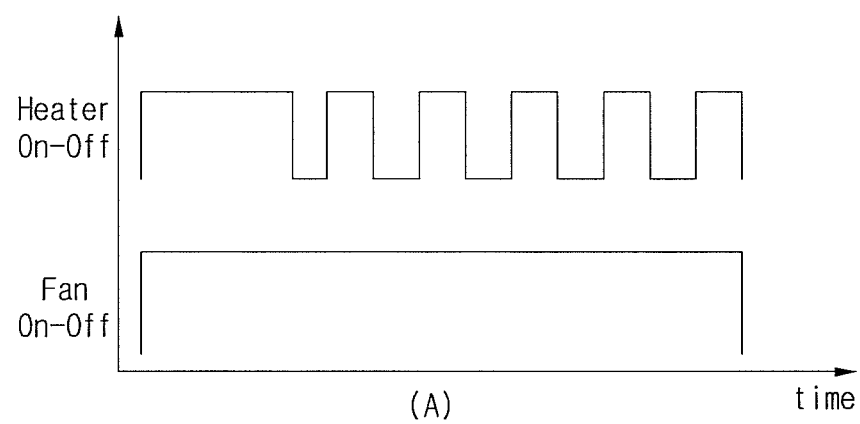
FIG. 16 is a graph illustrating ON/OFF times of a convection heater and a convection motor in a cooking appliance control method according to the second embodiment.
Figure 16:
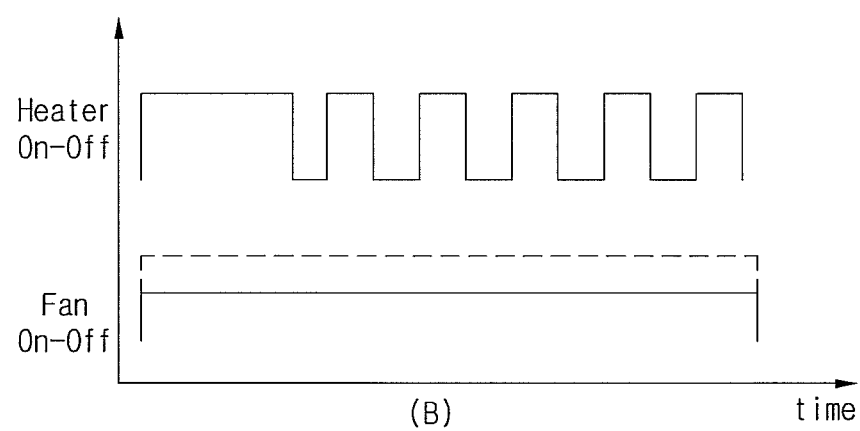

FIG. 16 is a graph illustrating ON/OFF times of a convection heater and a convection motor in a cooking appliance control method according to the second embodiment. Detailed descriptions with respect to the fundamentally same portions as those of the above first embodiment in the method of controlling the cooking appliance will be omitted.

Referring to FIG. 16A, in the current embodiment, when the food within the cooking chamber 160 is cooked at a relatively high temperature, i.e., when the input unit 10 receives the first signal, the convection heaters 710 and 720 and the convection motor 500 are controlled, like the method of controlling the cooking appliance according to the first embodiment.

However, referring to FIG. 16B, when the food within the cooking chamber 160 is cooked at a relatively low temperature, i.e., when the input unit 10 receives the second signal, the control unit 20 controls the convection heaters 710 and 720 to repeat the ON/OFF operation of the convection heaters 710 and 720 for a predetermined period and controls the convection motor 500 so that the convection motor 500 is rotated at a set rotation rate in which the maximum rotation rate of the convection motor 500 is reduced by a preset ratio. Here, the period of the ON/Off operation of the convection heaters 710 and 720 may be equal to that a case in which the input unit 10 receives the first signal, like the method of controlling the cooking appliance according to the first embodiment or an OFF time may be relatively increased. Here, the set rotation rate may be set to a range of about 40% to about 70% of the maximum rotation rate, preferably, about 60% of the maximum rotation rate. When the set rotation rate is set to the above-described value, effects similar to those of the method of controlling the cooking appliance according to the first embodiment may be expected.

As described above, in the cooking appliance according to the embodiments, the following effects may be expected.

First, since a cross-flow fan is used as the convection fan, an amount of air circulating between the cooking chamber and the convection chamber may be increased. Thus, the food may be more effectively cooked.

Also, the operation of the convection motor driving the convection fan may be controlled into various modes according to the cooking temperature and kind of food to be cooked within the cooking chamber. Thus, the food may be more effectively cooked according to the cooking temperature and the kind of food to be cooked.

Also, the thermistor for detecting a temperature for controlling the heating source including the convection device is installed inside the convection chamber. Thus, the thermistor may more precisely detect the temperature for controlling the heating source to more precisely cook the food using the cooking appliance.

In addition, the convection fan may be directly connected to the motor shaft or the coupler for connecting the convection fan to the motor shaft may be formed of a metal material to support the elastic support part. Thus, it may prevent the coupler from being damaged at a high temperature to increase the durability of the product.

It should be understood that numerous other modifications and embodiments can be devised by those skilled in the art that will fall within the spirit and scope of the principles this disclosure. More particularly, various variations and modifications are possible in the component parts and/or arrangements of the subject combination arrangement within the scope of the disclosure, the drawings and the appended claims.

What is claimed is:

1. A cooking appliance comprising:
a cavity that forms part of a cooking chamber in which a food is cooked, the cavity comprising a back plate provided with an intake hole and an exhaust hole disposed under the intake hole;
a convection chamber in communication with the cooking chamber;
a cross flow fan that circulates air between the cooking chamber and the convection chamber;
a motor comprising a motor shaft coupled to the cross flow fan, the motor providing a driving force to rotate the cross flow fan;
a heating source that heats air discharged from the inside of the convection chamber to the inside of the cooking chamber, the heating source being disposed under the cross flow fan; and
a temperature detection part disposed inside the convection chamber between the intake hole and the cross flow fan to detect a temperature of air drawn from the inside of the cooking chamber to the inside of the convection chamber.

2. The cooking appliance according to claim 1, wherein an operation of the cross flow fan is decided according to a cooking temperature or a kind of food to be cooked within the cooking chamber.

3. The cooking appliance according to claim 1, wherein, the cross flow fan performs a continuous ON operation at a maximum rotation rate, repeatedly performs an ON/OFF operation at the maximum rotation rate for a preset period, or continuously performs an ON operation at a set rotation rate in which the maximum rotation rate is reduced by a preset ratio, when the cross flow fan repeatedly performs the ON/OFF operation at the maximum rotation rate for a preset period, a ratio of an ON operation time to an OFF operation time of the cross flow fan is about 3:7 to about 7:3.

4. The cooking appliance according to claim 1, wherein, the cross flow fan performs a continuous ON operation at a maximum rotation rate, repeatedly performs an ON/OFF operation at the maximum rotation rate for a preset period, or continuously performs an ON operation at a set rotation rate in which the maximum rotation rate is reduced by a preset ratio, when the cross flow fan repeatedly performs the ON/OFF operation at the maximum rotation rate for a preset period, a ratio of an ON operation time to an OFF operation time of the cross flow fan is about 2:3.

5. The cooking appliance according to claim 3, wherein, when the cross flow fan repeatedly performs the ON/OFF operation at the maximum rotation rate for a preset period, an OFF operation time of the cross flow fan is less than about 60 seconds.

6. The cooking appliance according to claim 3, wherein the set rotation rate is set to a range of about 40% to about 70% of the maximum rotation rate.

7. The cooking appliance according to claim 1, wherein the cross flow fan is rotated with respect to a rotation shaft of a horizontal. direction, and
the temperature detection part is inserted from an upper side of the convection chamber into a lower side so that a front end of the temperature detection part is disposed above the rotation shaft of the cross flow fan.

8. The cooking appliance according to claim 1, wherein the cross flow fan comprises:
at least two disks spaced from each other; and
a plurality of blades disposed between the disks,
wherein the motor shaft is directly coupled to one of the disks to transmit the driving force of the motor into the cross flow fan.

9. The cooking appliance according to claim 8, wherein a shaft fixing hole having a D shape is defined in the disks, and an end of the motor shaft has a shape corresponding to that of the shaft fixing hole.

10. A cooking appliance comprising:
a cavity having a cooking chamber in which a food is cooked, the cavity having an intake hole and an exhaust hole which are defined in a. back plate defining a rear surface of the cooking chamber and are spaced from each other;
a heating source providing energy for cooking the food in the cooking chamber;
a convection cover fixed to a rear surface of the back plate, the convection cover defining a convection chamber between an inner surface thereof and the rear surface of the back plate;
a convection fan located inside the convection chamber, the convection fan blowing air in a direction perpendicular to that of a rotation shaft so that the air is drawn from an inside of the cooking chamber to an inside of the convection chamber through the intake hole and discharged from the inside of the convection chamber to the inside of the cooking chamber through the exhaust hole;
a convection motor comprising a motor shaft which provides a driving force that rotates the convection fan; and
a convection heater installed inside the convection chamber to heat the air flowing by the convection fan,
wherein the cross flow fan comprises:
at least two disks spaced from each other; and
a plurality of blades disposed between the disks, one of the at least two disks comprises a shaft fixing hole having a D shape, and an end of the motor shaft has a shape corresponding to that of the shaft fixing hole.

11. The. cooking appliance according to claim 10, wherein the convection fan continuously performs an ON operation at a maximum rotation rate when a cooking temperature within the cooking chamber is greater than a preset temperature, and the convection fan repeatedly performs the ON/OFF operation at the maximum rotation rate for the preset period or continuously performs the ON operation at the set rotation rate in which the maximum rotation rate is reduced by the preset ratio when the cooking temperature within the cooking chamber is less than the preset temperature.

12. The cooking appliance according to claim 10, wherein the convection fan continuously performs an ON operation at a maximum rotation rate when the food cooked within the cooking chamber is meat, and the convection fan repeatedly performs the ON/OFF operation at the maximum rotation rate for the preset period or continuously performs the ON operation at the set rotation rate in which the maximum rotation rate is reduced by the preset ratio when the food cooked within the cooking chamber is bread.

13. The cooking appliance according to chum 11, wherein, the convection fan repeatedly performs the ON/OFF operation at the maximum rotation rate for a preset period, a ratio of the total sum of an ON operation time to a total operation time of the convection fan is about 3:10 to about 7:10.

14. The cooking appliance according to claim 11, wherein, the convection fan repeatedly performs the ON/OFF operation at the maximum rotation rate for a preset period, a ratio of the total sum of an ON operation time to a total operation time of the convection fan is about 2:5.

15. The cooking appliance according to claim 11, wherein, the convection fan repeatedly performs the ON/OFF operation at the maximum rotation rate for a preset period, an OFF operation time of the convection fan is less than about 60 seconds.

16. The cooking appliance according to claim 11, wherein the set rotation rate is set to about 60% of the maximum rotation rate.

17. The cooking appliance according to claim 10, further comprising
a thermistor that detects a temperature of the air drawn from the inside of the cooking chamber to the inside of the convection chamber through the intake hole,
wherein the heating source, the convection fan, and the convection heater are controlled according to a temperature detected by the thermistor.

18. The cooking appliance according to claim 17, wherein a fan installation hole that accepts the convection fan and a thermistor installation hole that accepts the thermistor ate defined in both side surfaces and a top surface of the convection cover, respectively, and
the thermistor passes through the thermistor installation hole so that a front end of the thermistor is disposed above the fan installation hole.

19. The cooking appliance according to claim 17, wherein the convection cover comprises:
an inner cover fixed to a rear surface of the back plate;
an outer cover fixed to the rear surface of the back plate. to cover the inner covet; and
at least two side covers fixed. to the tear surface of the back plate and both side surfaces of the inner cover,
wherein the convection chamber is defined by the back plate, the inner cover, and the side covet, and
the thermistor passes through the inner cover and the outer cover and is disposed within the convection chamber.

20. The cooking appliance according to claim 17, wherein the convection fan comprises:
at least two disks spaced from each other;
a plurality of blades disposed between the disks; and
a coupling member coupling the motor shaft. to the disks,
wherein the coupling member comprises:
a fixing hole defined in one of the disks;
an elastic support inclinedly extending at a preset angle on an inner circumference of the fixing hole; and
a coupler passing through the fixing hole in a state where the motor shaft is inserted, the coupler being supported by the elastic support.

21. The cooking appliance according to claim 20, wherein the elastic support part is integrated with the disks.

22. The cooking appliance according to claim 20, wherein a sectional area of the coupler in a direction perpendicular to a direction in which the coupler is inserted into the fixing hole has a size less than that of the fixing hole so that at least one portion of the coupler contacts the elastic support.

\* \* \* \* \*